Patented May 22, 1945

2,376,837

UNITED STATES PATENT OFFICE 2,376,837

CARBALKOXYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application January 13, 1941, Serial No. 374,254

8 Claims. (Cl. 260—485)

This invention relates to carbalkoxylation of organic compounds, and with respect to certain more specific features, to the introduction of carbalkoxy groups into esters.

This application is a continuation-in-part of our copending application Serial No. 287,001, filed July 28, 1939.

Among the several objects of the invention may be noted the provision of a general process for bringing about a carbalkoxylation of the type indicated, which is characterized by its high yield, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes and products hereinafter described, and the scope of the application of which will be indicated in the following claims.

While the process of the present invention provides primarily for the introduction of a carbalkoxy group into an ester, it also, in many instances, produces the carbalkoxylated product in the form of a highly reactive metallo derivative which readily lends itself to further steps of synthesis. For example, when phenylacetic ester is carbalkoxylated, as in Example 1, the reaction product is the metallo derivative of the phenyl malonic ester. This metallo compound can then be directly alkylated by the well-known procedures for alkylating malonic esters, or if the mono-substituted malonic ester is desired, the metallo group may be replaced by hydrogen in the usual fashion. The metal of such a group is usually and preferably one of the alkali metals.

Broadly speaking, the process of the present invention comprises the carbalkoxylation of esters through the interaction of an ester, a dialkyl carbonate, and a metal alcoholate, in the dialkyl carbonate, preferably in substantial excess, as the reaction medium. This may be represented by the following equation:

$$XCH_2CO_2R + R'_2CO_3 + MOR'' \rightarrow$$
$$XC(M)(CO_2R')CO_2R + R'OH + R''OH$$

where X is the residue of the compound to be carbalkoxylated, and may be hydrogen, R is an organic esterifying group, R' is the alkyl of the dialkyl carbonate, M is an alkali metal, and R'' is the radical of the alcoholate.

While the reaction is preferably carried out with a symmetrical dialkyl carbonate as shown in the equation, it can be carried out with an unsymmetrical dialkyl carbonate. In such cases, a mixture of carbalkoxylated compounds and product alcohols may be formed.

The mechanism of the reaction involved in the process of the present invention has not yet been definitely established. The large excess of dialkyl carbonate which is preferred, appears, however, to be an important factor.

The reaction may be pushed to substantial completion by heating as it progresses, to distill off the product alcohols (R'OH and R''OH in the above equation). In case the original metal alcoholate contains alcohol, such alcohol is likewise removed by this distillation procedure. This procedure, while somewhat optional, is highly advantageous in its improvement in the yield of carbalkoxylated compound obtained.

The process of the present invention is of particular utility, for example, in the preparation of metallo derivatives of substituted malonic esters, such as the sodio phenyl malonic esters. The diethyl ester of sodio phenyl malonic acid is an intermediate for the preparation of phenylethyl malonic esters, which in turn may be converted into phenobarbital (phenylethyl barbituric acid). Where the intended use of the sodio compound is the preparation therefrom of an alkyl substituted malonic ester such as phenylethyl malonic ester, the sodio compound need not be recovered from the residue as such, but the residue may be alkylated to form the alkylated compound which is recovered from the reaction mixture.

The following examples illustrate certain specific embodiments of the present invention, but are intended to be by way of example only:

EXAMPLE 1

Ethyl phenylacetate

Diethyl carbonate (450 ml.) was placed in a 1 liter, three-necked flask fitted with a mechanical stirrer. Solid alcohol-free sodium methylate (43 g.) and ethyl phenylacetate (123 g.) were added. The mixture became yellow and there was a little heat of reaction. By warming gently, all of the sodium methylate was brought into solution. The flask was attached to a fractionating column arranged for distillation at 175 mm. pressure. Alcohol was obtained as distillate at first, and then the temperature rose to 72° C. at 175 mm. at the head of the column, which corresponds approximately to the boiling point of diethyl carbonate. The residue in the flask consists principally of the desired sodium derivative of phenylmalonic ester with an excess of diethyl carbonate.

The sodium derivative may be alkylated as follows: After cooling the reaction mixture, ethyl bromide (100 g.) was added and the flask was heated slowly to about 90° C. and maintained at that temperature for four hours. A solid (sodium bromide) separated from the solution. After cooling, the reaction mixture was acidified with acetic acid and agitated with ice water. The water layer was separated and extracted with a little ether. The organic layers were combined, washed with water, dried over calcium chloride and distilled, yielding recovered diethyl carbonate (300 g.) and phenylethylmalonic ester (166.6 g.) boiling between 130° C. at 30 mm. and 142° C. at 4 mm. Assuming the product to be pure phenylethylmalonic ester the yield based on ethyl phenylacetate was about 84% of the theoretical. The identity and purity of the product phenylethylmalonic ester was established by condensing a sample of it with urea. A high yield of phenobarbital, melting at 175–176° C., was obtained. The yield and purity of the phenobarbital was as good as is usually obtained from pure diethyl phenylethylmalonate made by other methods.

Carrying out the above carbalkoxylation without the simultaneous removal, by distillation, of the alcohols produced in the reaction, is entirely feasible, but the yield is somewhat decreased.

Example 2

Ethyl phenylacetate

Sodium ethylate substantially free of alcohol was prepared as follows: Sodium (18 g.) was dissolved in anhydrous ethyl alcohol (350 ml.) in a 1 liter, three-necked flask; the flask was arranged for distillation and heated by an oil bath until no more alcohol distilled when the temperature of the bath was 165° C. After cooling, the sodium ethylate remained as a solid cake containing alcohol of crystallization. Diethyl carbonate (450 ml.) and ethyl phenylacetate (123 g.) were added to the cooled sodium ethylate and the reaction mixture was stirred and warmed to about 60° C. for one hour during which the solid dissolved. The flask was connected to a fractionating column and alcohol was distilled at 150 mm. pressure. Alcohol was collected at 42–45° C. at 150 mm., and then the temperature at the head of the column rose rapidly to 74° C. at 150 mm., which corresponds approximately to the boiling point of diethyl carbonate. The formation of no more alcohol after arriving at this state showed that the carbalkoxylation reaction had been completed. The reaction mixture was cooled, acidified with acetic acid (47 ml.) and agitated with ice water. The water layer was separated and extracted with a little ether. The organic layers were combined, washed with water, dried over calcium chloride and distilled until all diethyl carbonate had been removed. The residue was distilled from a Claisen flask at reduced pressure, yielding recovered ethyl phenylacetate (8 g.) and substantially pure diethyl phenylmalonate (134 g.), boiling point 129–130° C., at 2 mm. The yield of diethyl phenylmalonate was 75% of the theoretical based on ethyl phenylacetate introduced into the reaction.

The foregoing and subsequent examples may be carried out, if desired, by placing the dialkyl carbonate and the ester in a flask under a reflux, and then gradually dropping in the metal alcoholate, which is preferably dissolved in alcohol. Simultaneously the alcohol is preferably taken off as a distillate at the head of the column.

If desired, the reactions described herein may be carried out at atmospheric pressure, rather than under reduced pressure. The selection of operating pressures is determined merely by manipulative convenience, in most instances.

Example 3

Methyl phenylacetate

Into a 500 ml. flask equipped with a stirrer were placed dimethyl carbonate (150 ml.), alcohol-free sodium methylate (19 g.), and methyl phenylacetate (50 g.). The mixture was stirred and warmed at 50 to 60° C. for two hours, and then the flask was attached to a distillation column and fractionated at 350 mm. pressure, until the boiling point of the product was 65° C., and a sample was insoluble in water. This showed that all the methyl alcohol formed by the reaction had been removed. Acetic acid (25 ml.) and ice water (150 ml.) were added, and the mass was agitated thoroughly. The organic layer was separated and distilled through a fractionating column, obtaining at first dimethyl carbonate, boiling at 90° C. at atmospheric pressure, and recovered methyl phenylacetate (16 g.) boiling at 84° C. at 4 mm. and finally, dimethyl phenylmalonate (39 g.), which distilled at about 122° C. at 3 mm. pressure. The melting point of the dimethyl phenylmalonate produced was 47 to 48° C. The dimethyl phenylmalonate produced represented a yield of 84% of the theoretical, based upon the amount of methyl phenylacetate not recovered.

Example 4

Propyl phenylacetate

Potassium metal (10 g.) was dissolved in anhydrous n-propyl alcohol (100 ml.) and distilled until no more alcohol was removed when heated at 100° C. and 35 mm. pressure. After cooling, di-n-propyl carbonate (200 g.) and n-propyl phenylacetate (45 g.) were added. After stirring for about an hour, the flask was attached to a fractionating column and distilled under a pressure of 100 mm. until no more propyl alcohol, boiling at 53° C., was obtained as distillate, and the temperature rose quickly to 99° C., the boiling point of dipropyl carbonate at 100 mm. After cooling the reaction mixture, it was acidified with acetic acid (17 ml.), and agitated with ice water. The organic layer was separated and distillated at reduced pressure. At first dipropyl carbonate was obtained, then propyl phenylacetate (13 g.), distillating at 95 to 110° C. at 5 mm. pressure, and finally di-n-propyl phenylmalonate (38.2 g.) distilling at 146 to 148° C. at 4 mm. pressure. The yield of di-n-propyl phenylmalonate was 80%, based upon the acetate consumed.

Example 5

Ethyl p-methylphenylacetate

Sodium (5.6 g.) was added to anhydrous ethyl alcohol (150 ml.) in a 500 ml. three-necked flask attached to a fractionating column. When the reaction was complete the flask was heated by an oil bath until no more alcohol distilled when the temperature of the bath was 120° C. and the pressure was 20 mm. After cooling, the sodium ethylate remained as a solid cake containing alcohol of crystallization. The cake was mechanically broken up and diethyl carbonate (250 ml.) was added. The flask was arranged with a stirrer and the remaining alcohol was fractionated out at 150 mm. pressure and a bath temperature of 100° C.

The resulting alcohol-free suspension of sodium ethylate in diethyl carbonate was cooled to 25° C.

Ethyl p-methylphenylacetate (44 g.) was added over one-half hour. The mixture was heated to 90° C. and alcohol (45 ml.) was fractionated out over 2.5 hours at a pressure of 150 mm. The mixture was then cooled and decomposed with acetic acid and water. The organic layer was separated, wash free of acid, dried and then fractionated. A yield of 65% (43 g.) of diethyl p-methylphenylmalonate, boiling point 124–125° C. at 1–2 mm., and $n$ 20/D1.4930, was obtained The ester was identified by converting it by alkaline hydrolysis to the known p-methylphenylmalonic acid, melting at 142–143° C.

Example 6

Ethyl p-iodophenylacetate

A mixture of sodium ethylate (¼ mol) and diethyl carbonate (250 ml.) was prepared as in Example 5. Then at 20° C., ethyl p-iodophenylacetate (72 g.) was added. The mixture was heated to 90° C. at a pressure of 150 mm. and alcohol (30 ml.) was fractionated out at 35–40° C. over a period of one hour. After another 15 ml. of distillate was taken off the temperature of the distillate was 70° C. showing that all the alcohol formed had been removed. The mixture was worked up as in Example 5 and a yield of 61% (55 g.) of diethyl p-iodophenylmalonate was obtained boiling at 165° C. at 1.5 mm. and having an index of refraction of $n$ 20/D 1.5432 to 1.5438. The equivalent saponification of this material was found to be 181, which is the theoretical value for this ester. The compound was analyzed and found to contain 42.8% carbon and 4.1% hydrogen. Theory: carbon 43.1%, hydrogen 4.1%.

Example 7

Ethyl homoveratrate

A mixture of sodium ethylate (¼ mol) and diethyl carbonate (250 ml.) was prepared as in Example 5. Ethyl homoveratrate (56 g.) was then added to the mixture at room temperature and at atmospheric pressure during fifteen minutes. Most of the sodium ethylate went into solution and the latter became colored brown. The pressure was then reduced to 150 mm., the bath temperature was raised to 90–100° C., and 50 ml. of distillate was fractionated out at 30–50° C. within 1.5 hours. Then no more alcohol was formed and the distilling temperature rose to 70° C. The mixture was cooled with an ice water bath to around 20° C. and worked up as in Example 5. There was obtained a 68% (45 g.) yield of diethyl 3,4-dimethoxyphenylmalonate of boiling point 169–170° C. at 1 mm. and index of refraction, $n$ 20/D 1.5072–1.5080. The theoretical saponification equivalent is 148 and that found was 149. The compound was analyzed and found to contain 60.9% carbon and 6.9% hydrogen. Theory: carbon 60.8%, hydrogen 6.7%.

Example 8

Ethyl α-naphthylacetate

Sodium ethylate was prepared by dissolving sodium (1.4 g.) in anhydrous alcohol (50 ml.), and the solution was distilled to dryness and heated at 100° C. under 35 mm. pressure until no more alcohol could be removed. After cooling the residue, a solution of ethyl α-naphthylacetate (10 g.) in diethyl carbonate (150 ml.) was added. The reaction mixture was stirred and warmed until it refluxed under a packed column at 200 mm. pressure. Alcohol was removed as distillate from the head of the column, 15 ml. being obtained at 50 to 55° C. under 200 mm. pressure. The temperature then rose to 84° C. under 200 mm. pressure, which corresponds approximately to the boiling point of diethyl carbonate. The reaction mixture was cooled and poured onto ice and acetic acid (5 ml.), and the organic layer was separated and washed with water. After the solvent was distilled off until no more distillate was obtained at 35 mm. pressure and a bath temperature of 100° C., there remained 13 g. of an oil as residue. Addition of petroleum ether caused the residue to crystallize, and the solid was filtered and washed with petroleum ether. It was dissolved in a little anhydrous alcohol and crystallized by the addition of petroleum ether. The crystals obtained melted at 59 to 60° C. These were diethyl α-naphthylmalonate. The yield was 67%.

Example 9

Ethyl β-phenylpropionate

Sodium ethylate substantially free of alcohol was prepared from 8 g. of sodium, as described in Example 2. Diethyl carbonate (250 ml.) and ethyl β-phenylpropionate (60 g.) were added to the cooled sodium ethylate. The flask was connected to a fractionating column and the reaction mixture was stirred and heated. Alcohol (70 ml.) boiling at 70–80° C. was obtained as distillate in five hours. After cooling the reaction mixture was acidified with acetic acid (25 ml.) and agitated with ice water. The organic layer was separated, washed with water, dried and distilled. After the diethyl carbonate had been removed, diethyl benzylmalonate (55.6 g.), boiling at about 105° C. at 1 mm., was obtained. The index of refraction of the product was about $n$ 26.5/D, 1.484.

The identity of the product was proved by converting it to benzylmalondiamide by shaking a portion of the distillate (2 ml.) with concentrated ammonia water (5 ml.) and keeping over night. On the following day the needles which had separated were filtered off, washed with ether and water and dried. The benzylmalondiamide melted at 229–230° C.

Example 10

Ethyl acetate

A mixture was made of sodium ethylate (½ mol) and diethyl carbonate (250 ml.) as in Example 5. The flask containing the mixture was arranged with a stirrer and a reflux condenser. The mixture was stirred and heated at 115–125° C. and ethyl acetate (44 g.) was added during one hour. The mixture was then stirred and refluxed one hour at a bath temperature of 120–125° C. Then 55 ml. of distillate was fractionated out during 1.5 hours at 70–80° C. Then the distilling temperature rose rapidly to 90° C. The mixture was cooled and worked up as in Example 5. There were obtained a 30% (26 g.) yield of diethyl malonate, boiling point 100–105° C. at 27 mm. and index of refraction $n$ 25.5/D 1.4110–1.4113, and a 10% (10 g.) yield of tricarbethoxymethane, boiling point 123° C at 6 mm. and index of refraction $n$ 25.5/D 1.4227, and melting point 24–26° C. The diethyl malonate was identified by preparing from it malodiamide of melting point 172–174° C.

Example 11

Ethyl butyrate

A mixture was made of sodium ethylate (½ mol) and diethyl carbonate (250 ml.) as in Example 5. The mixture was heated to a bath temperature of 130° C. and stirred, and ethyl butyrate (58 g.) was added over a period of one hour. The bath temperature was then raised to 145–150° C. and during 4.5 hours 50 ml. of ethyl alcohol was fractionated out. The product was worked up as in Example 5. There was obtained a yield of 44% (41 g.) of diethyl ethylmalonate, boiling at 94–96° C. at 13 mm. pressure and having an index of refraction of $n$ 20/D 1.4170.

There was also obtained a 10% (9 g.) yield of diethyl diethylmalonate. The total product yield was about 55%. It will be noted that in this instance, as in several examples subsequently, diethyl carbonate apparently acts as an ethylating agent, as well as taking part in the carbalkoxylation.

The diethyl ethylmalonate was identified by hydrolyzing it to give ethylmalonic acid, melting at 111–113° C. The diethyl diethylmalonate was identified by hydrolyzing it to give diethylmalonic acid, melting at 126–128° C.

EXAMPLE 12

Ethyl caproate

A mixture was made of sodium ethylate (½ mol) and diethyl carbonate (400 ml.) as in Example 5. This mixture was stirred and heated to a bath temperature of 150–155° C. and ethyl caproate (72 g.) was added during ½ hour. Then, during three hours, ethyl alcohol (55 ml.) was fractionated out at atmospheric pressure. The mixture was cooled and worked up as in Example 5. There were obtained a yield of 26% (27 g.) of diethyl butylmalonate, boiling at 136–137° C. at 21 mm. and having an index of refraction, $n$ 20/D 1.4250, and a yield of 34% (41 g.) of diethyl ethylbutylmalonate, boiling at 124° C. at 12 mm. and having an index of refraction of $n$ 20/D 1.4280. The esters were identified by hydrolysis to the corresponding malonic acids.

EXAMPLE 13

Ethyl stearate

Sodium ethylate substantially free of alcohol was prepared from 2.4 g. of sodium, as described in Example 2. Diethyl carbonate (150 ml.) and ethyl stearate (31 g.) were added to the cooled sodium ethylate and the reaction mixture was stirred and refluxed under a column at 250 mm. pressure for ¾ hour. Then the reaction mixture was refluxed at atmospheric pressure and alcohol (9.1 g.) was obtained as distillate during three hours. The temperature at the head of the column rose to 125° C., the boiling point of diethyl carbonate, and no more alcohol could be obtained. The excess diethyl carbonate was distilled off as completely as possible at reduced pressure leaving a waxy solid. The residue was agitated with ether, acetic acid (10 ml.) and water, and the organic layer was separated, washed and dried. Evaporation of the ether gave 40 g. of an oil which solidified at about 10° C. This was distilled yielding diethyl cetylmalonate (27.8 g.), boiling at 185–190° C. at 1 mm. The identity of the product was proved by hydrolyzing it to cetylmalonic acid. A portion of the distillate (11 g.) was refluxed for three hours with potassium hydroxide (8 g.) in alcohol (100 ml.). The alcohol was evaporated and the residue was dissolved in water and acidified with hydrochloric acid. The oil was extracted with ether and the extract was evaporated to dryness. The residue was recrystallized from acetic acid and washed with petroleum ether. The cetylmalonic acid melted at 117–120° C.

EXAMPLE 14

Butyl stearate

Potassium metal (20 g.) was dissolved in n-butyl alcohol (200 cc.) in a 1 liter, three-necked flask. The flask was arranged for distillation at reduced pressure and heated by an oil bath until no more distillate was obtained when the temperature of the bath was about 130° C., and the pressure was about 30 mm. After cooling, the potassium butylate remained as a solid cake containing some butyl alcohol of crystallization. Di-n-butyl carbonate (435 g.) and butyl stearate (170 g.) were added. The flask was fitted with a mechanical stirrer and attached to a fractionating column. Butyl alcohol was fractionated out of the reaction mixture at 54–60° C. at 50 mm. pressure. When no more butyl alcohol was obtainable as distillate the reaction mixture was cooled and poured onto ice and acetic acid (35 cc.). The organic layer was separated and distilled through a column at reduced pressure until all dibutylcarbonate had been removed. The residue was distilled from a Claisen flask at reduced pressure. Dibutyl cetylmalonate (123 g.) was obtained, boiling at about 206–215° C. at 2 mm., $n$ 26/D 1.4432–1.4441.

EXAMPLE 15

Ethyl iso-valerate

A mixture of sodium ethylate (0.4 mol) and diethyl carbonate (300 ml.) was made up as in Example 5. The mixture was stirred and ethyl iso-valerate (52 g.) was added. Then, during twelve hours, 25 ml. of distillate, mostly ethyl alcohol, was fractionated out at atmospheric pressure and a bath temperature of 170–175° C. The mixture was cooled and worked up, as described in Example 5. There were obtained yields of 30% (26 g.) of diethyl iso-propyl-malonate, boiling at 106–109° C. at 18 mm. and having an index of refraction of $n$ 21.5/D 1.4186–1.4190, and 10% (7 g.) of diethyl ethyl-iso-propylmalonate of boiling point 114° C. at 18 mm. and having an index of refraction of $n$ 21.5/D 1.4282–1.4300. The diethyl iso-propylmalonate was identified by hydrolyzing it to iso-propylmalonic acid, melting at 88–90° C. The diethyl ethyl-iso-propylmalonate was identified by hydrolyzing it to ethyl-iso-propylmalonic acid, melting at 132–134° C.

EXAMPLE 16

Ethyl iso-amylacetate

A mixture of sodium ethylate (0.28 mol.) and diethyl carbonate (250 ml.) was prepared as in Example 5, and ethyl iso-amylacetate (45 g.) was added. The mixture was stirred at a bath temperature of 155–160° C. During three hours, 33 ml. of ethyl alcohol was fractionated out, and the mixture was then refluxed for three hours longer. It was worked up in the manner described in Example 5. Yields of 25% (15 g.) of diethyl iso-amylmalonate, of boiling point 130° C. at 16 mm., and of 45% (30 g.) of diethyl iso-amylethylmalonate, boiling point 135° C. at 16 mm., were obtained. The diethyl iso-amylmalonate was identified by hydrolyzing it to iso-amylmalonic acid, which melted at 100–102° C. The diethyl iso-amylethylmalonate was identified by hydrolyzing it to ethyl-iso-amylmalonic acid, which melted at 120–121° C.

Example 17

Butyl laurate

Potassium metal (15 g.) was dissolved in n-butyl alcohol (100 ml.) and the solution was distilled to dryness at reduced pressure. Dibutyl carbonate (350 ml.) and butyl laurate (77 g.) were added to the cooled residue. Butyl alcohol was fractionated out of the reaction mixture according to the procedure described in Example 14, a total of 88 g. of distillate being obtained in three hours, boiling at 47–104° C. at 25 mm. The reaction mixture was cooled and poured onto ice and acetic acid (25 ml.) and the organic layer was separated, washed and dried. After distilling off the excess dibutyl carbonate there was obtained di-n-butyl decylmalonate (65.4 g.) boiling chiefly at 159–160° C. at 1.5 mm. The index of refraction of the product was $n$ 26.5/D, 1.4390. Its identity was proved by determination of the saponification equivalent: found 179.3 and 180.9; calculated for $C_{21}H_{40}O_4$, 178.1.

Example 18

Ethyl laurate

Sodium ethylate was made by dissolving sodium metal (7.5 g.) in anhydrous alcohol (150 ml.) and distilling the mixture to dryness. After cooling, dry diethyl carbonate (300 ml.) and ethyl laurate (68 g.) were added. The reactants were stirred and refluxed under a packed column at 200 mm. pressure, and alcohol was removed as distillate. After two hours, very little more alcohol was obtained, and the mixture was refluxed at atmospheric pressure for two hours more. After cooling the mixture was acidified with acetic acid (20 ml.), and shaken with water. The organic layer was washed, dried and distilled. After removing the diethyl carbonate, diethyl decylmalonate (45 g.) was obtained.

The product distilled at about 130–132° C. at 1.5 mm., and its index of refraction was $n$ 26/D, 1.4341. Its identity was further established by converting it to the free acid. The product was hydrolyzed by refluxing for three hours with potassium hydroxide (25 g.) dissolved in alcohol (200 ml.). The alcohol was evaporated, the residue was dissolved in water and decylmalonic acid was precipitated by adding excess hydrochloric acid. After recrystallizing from a mixture of cholorform and petroleum ether it melted at 118–119.5° C. The neutral equivalent found was 122.2 and calculated for $C_{13}H_{24}O_4$ is 122.1.

Example 19

Ethyl oleate

Sodium ethylate substantially free of alcohol was prepared from 8.5 g. of sodium, as described in Example 2. Diethyl carbonate (450 ml.) and ethyl oleate (93 g.) were added to the cooled sodium ethylate. The ethyl oleate was prepared by esterification of oleic acid U. S. P. and was not quite pure, as shown by its saponification equivalent being 327, compared to the theoretical of 310. The reactants were stirred and refluxed under a pressure of 200 mm. for two hours and then distilled through a column at atmospheric pressure until no more alcohol could be obtained. The reaction mixture was cooled and agitated with excess acetic acid and ice water and the organic layer was separated washed with water and dried. After removing the diethyl carbonate by distillation diethyl hexadecenylmalonate was obtained, boiling at about 190° C. at 1.5 mm. The composition of the product was shown to be substantially diethyl hexadecenylmalonate by determination of its saponification equivalent: found 210; calculated 191.

Example 20

Ethyl sebacate

Sodium (9.6 g.) was dissolved in ethyl alcohol (200 ml.), and the mixture distilled to dryness. The sodium ethylate remaining as residue was 44.2 g. After cooling, diethyl carbonate (200 ml.) and ethyl sebacate (50 g.) were added, and the mixture was stirred and heated under a packed column at 150 mm. pressure. Alcohol (21 g.), boiling at 42 to 44° C. at 150 mm. pressure were removed as distillate during two hours, and then the reaction mixture was heated at atmospheric pressure, and 23 g. more distillate were obtained in the following two hours. After cooling, the reaction mixture was acidified with acetic acid (25 ml.), and poured onto ice. The organic layer was separated, washed and distilled. After all the solvent had been removed, the residue weighed 67 g. The oil was distilled from a Claisen flask and 1,1,8-tricarbethoxyoctane, boiling at 185° C. under 1.5 mm. pressure, with some decomposition, was obtained. The composition of the product was established by determining its saponification equivalent; found 111.4; calculated for $C_{17}H_{30}O_6$, 110.

Carrying out the above carbalkoxylation reactions without the simultaneous removal by distillation of the alcohol produced in the reaction is entirely feasible, but the yield is somewhat decreased.

In general, it is preferred that the alkyl carbonate and the metal alcoholate shall contain the same alkyl groups in order to be certain that a mixture of products will not be obtained.

Attention is directed to our copending application, Serial No. 452,916, filed July 30, 1942, now Patent 2,367,632.

In view of the above it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

What is claimed is:

1. A process for carbalkoxylating an organic compound of the type $X.CH_2.CO_2R$, where X is an alkene radical and R is an alkyl radical, which comprises mixing said compound with an anhydrous alkali metal alcoholate and a large excess of a dialkyl carbonate over that required as a reactant, whereby one of the hydrogens of the $CH_2$ group is replaced by a carbalkoxyl group and the other hydrogen is replaced by an alkali metal.

2. A process for carbalkoxylating an organic compound of the type $X.CH_2.CO_2R$, where X is an alkene radical and R is an alkyl radical, which comprises mixing said compound with an anhydrous alcohol-free alkali metal alcoholate and a dialkyl carbonate in quantity sufficient to function as reagent and reaction medium, whereby one of the hydrogens of the $CH_2$ group is replaced by a carbalkoxyl group and the other hydrogen is replaced by an alkali metal, and removing alcohol.

3. A process for carbalkoxylating an organic compound of the type X.CH$_2$CO$_2$R, where X is an alkene radical and R is an alkyl radical, which comprises mixing and heating said compound with an anhydrous alcohol-free alkali metal alcoholate, and a large excess of a dialkyl carbonate, the quantity thereof being sufficient to function as reagent and reaction medium, and continuously removing alcohol from the reaction mixture, whereby one of the hydrogens of the CH$_2$ group is replaced by a carbalkoxyl group and the other hydrogen is replaced by an alkali metal.

4. A process for carbalkoxylating an organic compound of the type X.CH$_2$.CO$_2$R, where X is an alkene radical and R is a lower alkyl radical, which comprises mixing and heating said compound with an anhydrous alkali metal alcoholate and a large excess of a dialkyl carbonate over that required as a reactant.

5. A process for carbalkoxylating an organic compound of the type X.CH$_2$CO$_2$R, where X is an alkene radical and R is a lower alkyl radical, which comprises mixing and heating said compound with an anhydrous alkali metal alcoholate and a large excess of a dialkyl carbonate over that required as a reactant, and continuously subjecting the mixture to distillation for removing alcohol from the reaction mixture, whereby one of the hydrogens of the CH$_2$ group is replaced by a carbalkoxyl group and the other hydrogen is replaced by an alkali metal.

6. A process for carbalkoxylating an organic compound of the type X.CH$_2$.CO$_2$R, where X is an alkene radical and R is a lower alkyl radical, which comprises mixing said compound with an anhydrous alcohol-free alkali metal alcoholate of a lower alcohol and a large excess of a dialkyl carbonate having lower alkyl groups, the quantity of said carbonate being sufficient to provide reagent and reaction medium, and continuously subjecting the mixture to distillation for removing alcohol from the reaction mixture, whereby one of the hydrogens of the CH$_2$ group is replaced by a carbalkoxyl group and the other hydrogen is replaced by an alkali metal.

7. A process for carbalkoxylating ethyl oleate which comprises mixing and heating said compound with anhydrous sodium ethylate and a large excess of diethyl carbonate, the quantity thereof being sufficient to function as reagent and as reaction medium.

8. A process for carbalkoxylating ethyl oleate which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

VERNON H. WALLINGFORD.
AUGUST H. HOMEYER.